(12) United States Patent
Sennett et al.

(10) Patent No.: US 10,097,293 B2
(45) Date of Patent: Oct. 9, 2018

(54) COMMUNICATE AN ALERT VIA AN UNMANNED VEHICLE

(71) Applicant: AT&T Intellectual Property I, LP, Atlanta, GA (US)

(72) Inventors: DeWayne A. Sennett, Redmond, WA (US); Charles Peter Musgrove, Henderson, NV (US); Brian Kevin Daly, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/560,578

(22) Filed: Dec. 4, 2014

(65) Prior Publication Data

US 2016/0164619 A1    Jun. 9, 2016

(51) Int. Cl.
| | |
|---|---|
| H04M 11/04 | (2006.01) |
| H04H 20/59 | (2008.01) |
| H04B 7/185 | (2006.01) |
| H04W 4/90 | (2018.01) |
| H04H 20/08 | (2008.01) |
| H04W 4/021 | (2018.01) |
| H04H 60/51 | (2008.01) |
| H04W 4/04 | (2009.01) |

(52) U.S. Cl.
CPC ......... *H04H 20/59* (2013.01); *H04B 7/18506* (2013.01); *H04H 20/08* (2013.01); *H04W 4/021* (2013.01); *H04W 4/90* (2018.02); *H04H 60/51* (2013.01); *H04W 4/046* (2013.01)

(58) Field of Classification Search
CPC .......................... B64D 2203/00; H04W 4/025
USPC .......... 455/41.2, 75, 410; 340/539.13, 7.48; 701/23, 26, 2, 3, 4, 301, 454, 17; 706/21, 706/46; 370/332
See application file for complete search history.

(56) References Cited

U.S. PATENT DOCUMENTS

| | | | |
|---|---|---|---|
| 6,608,559 B1 | 8/2003 | Lemelson et al. | |
| 7,058,710 B2 | 6/2006 | McCall et al. | |
| 7,397,345 B2 * | 7/2008 | Lauper ............... | G06Q 30/0265 340/539.1 |
| 8,457,590 B2 | 6/2013 | Mitsuhashi | |

(Continued)

FOREIGN PATENT DOCUMENTS

| | | |
|---|---|---|
| CN | 202966613 U | 6/2013 |
| WO | WO 2014/106814 A2 | 7/2014 |

OTHER PUBLICATIONS

DeBusk, Wesley M. "Unmanned aerial vehicle systems for disaster relief: Tornado alley." AIAA Infotech@ Aerospace Conference, AIAA-2010-3506, Atlanta, GA. 2010.

*Primary Examiner* — Kiet Doan
(74) *Attorney, Agent, or Firm* — Baker Hostetler LLP

(57) ABSTRACT

Systems, methods, and apparatuses may use an unmanned vehicle to communicate an alert, such as an emergency alert, to a region, such as one affected by a natural disaster. A method may include receiving a message, which may comprise an alert and information associated with a region, from an alert originator. The message may then be transmitted, via a communication access device, to an unmanned vehicle. After receiving the message, the unmanned vehicle may travel to the region. Upon reaching the region, the unmanned vehicle may communicate the alert, whereby individuals' reception devices within the region may receive the alert.

17 Claims, 12 Drawing Sheets

(56) References Cited

U.S. PATENT DOCUMENTS

| | | | |
|---|---|---|---|
| 8,670,747 B1* | 3/2014 | Muller | H04W 84/005 |
| | | | 380/270 |
| 9,087,451 B1* | 7/2015 | Jarrell | G08G 5/0069 |
| 2007/0112705 A1 | 5/2007 | Mardirossian | |
| 2010/0315230 A1 | 12/2010 | Kwon et al. | |
| 2011/0245996 A1* | 10/2011 | Orsulak | G05D 1/0011 |
| | | | 701/2 |
| 2012/0143808 A1* | 6/2012 | Karins | G06N 7/005 |
| | | | 706/46 |
| 2012/0215382 A1* | 8/2012 | Lee | G05D 1/0033 |
| | | | 701/2 |
| 2012/0271461 A1 | 10/2012 | Spata | |
| 2013/0163565 A1* | 6/2013 | Lee | H04W 36/30 |
| | | | 370/332 |
| 2014/0025282 A1 | 1/2014 | Limbaugh et al. | |
| 2014/0085135 A1 | 3/2014 | Devaul et al. | |
| 2014/0355528 A1* | 12/2014 | Roy | H04W 72/048 |
| | | | 370/329 |
| 2016/0068264 A1* | 3/2016 | Ganesh | G08G 5/0069 |
| | | | 701/2 |

* cited by examiner

COMMUNICATE AN ALERT VIA AN UNMANNED VEHICLE

TECHNICAL FIELD

The technical field generally relates to alerts and more specifically to alerts by an unmanned vehicle.

BACKGROUND

When a major disaster, such as a hurricane, earthquake, tornado, fire, or terrorist attack, strikes an area, those individuals within the disaster area often seek information on the disaster and instructions on what they should do next and how best to protect themselves. Emergency notification systems address this concern by communicating alert messages through various communication channels such as broadcast television, terrestrial radio, satellite radio, and a cellular network. One such emergency notification system is the Federal Emergency Management Agency (FEMA) Integrated Public Alert and Warning System (IPAWS).

Major disasters, however, may disable or greatly impair the very communication channels upon which an emergency notification system relies. For example, a major hurricane may destroy the cell towers of a cellular network within an area, cutting off the ability of cellular users within the area from receiving emergency alerts on their cellular device.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

As an example, an apparatus may have instructions that effectuate the operations of receiving a message. The message may pertain to an event. The operations may also include receiving an indication of a first region. The operations may include determining that an unmanned vehicle is within range of the first region. Additionally, the operations may include, responsive to determining that the unmanned vehicle is within range of the first region, providing a first instruction to provide an indication of the event, wherein an intended recipient of the first instruction is equipment of the unmanned vehicle and wherein an intended recipient of the indication of the event is a reception device.

As another example, an apparatus may comprise a processor and a memory. The processor may be configured to communicate with and be incorporated into an unmanned vehicle. The memory may have instructions that effectuate the operations of receiving a message. The message may pertain to an event. The operations may also include receiving an indication of a first region. The operations may include determining that the unmanned vehicle is within range of the first region. The operations may additionally include, responsive to determining that the unmanned vehicle is within range of the first region, providing an indication of the event, wherein an intended recipient of the indication of the event is a reception device.

As yet another example, a computer-readable storage medium may have instructions that effectuate the operations of receiving, by an apparatus, a first message. The first message may pertain to an event. The apparatus may be configured to communicate with and be incorporated into an autonomous unmanned vehicle. The operations may also include receiving, by the apparatus, an indication of a region. The operations may also include determining that the autonomous unmanned vehicle is proximate to the region. Additionally, the operations may include, upon a determination that the autonomous unmanned vehicle is proximate to the region, providing a second message pertaining to the event.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

As described herein, an alert may be broadcast via an unmanned vehicle. In an example configuration, an alert originator, such as a government emergency services agency, or the like, may send an alert to a server to be communicated to devices in a particular area. For example, the area may be one that recently suffered a natural disaster and in which the communication infrastructure may be impaired or disabled. The server may transmit a message, including the alert and the associated region, via a communication access device such as a satellite system, radio transmission, or cellular network, to an unmanned vehicle.

The unmanned vehicle may travel to that region and communicate the alert to reception devices within the region.

Figure 1:
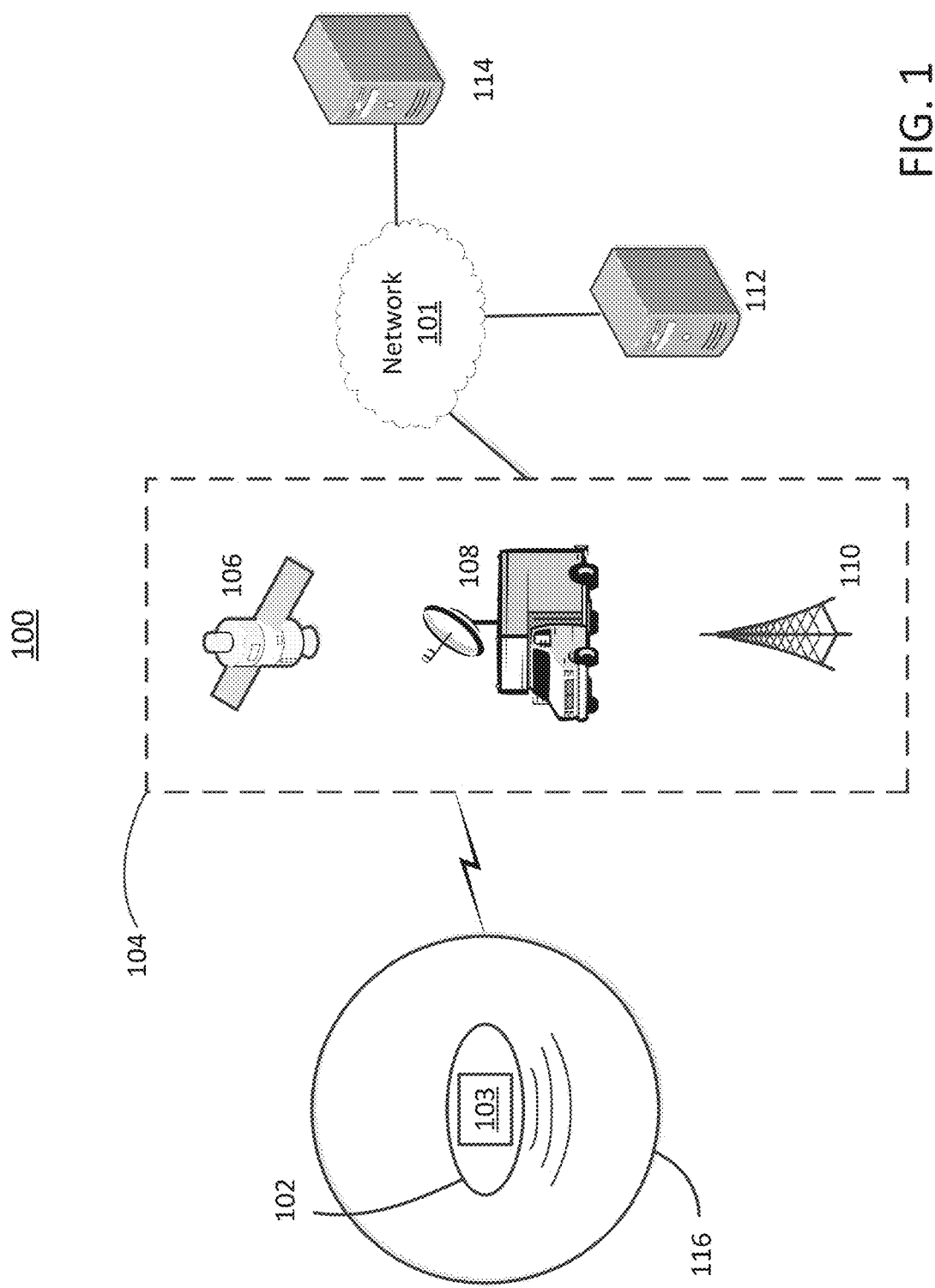
FIG. 1 illustrates an exemplary communication system which may be utilized to facilitate unmanned vehicle communications.

FIG. 1 illustrates an example communication system 100 in which one or more disclosed examples may be implemented. Communication system 100 may include unmanned vehicle 102, communication access device 104, server 112, and alert originator 114. The disclosed examples contemplate any number of unmanned vehicle 102, communication access device 104, server 112, and alert originator 114. Alert originator 114 may be communicatively connected to server 112 via network 101. Network 101 may be the Internet, a wireline network, a wireless network, or any other communication method. Server 112 may be communicatively connected to communication access device 104 also via, for example, the Internet, a wireline network, a wireless network, or any other communication method.

Server 112 or alert originator 114 may include any type of computing device, such as a general-use server. Exemplary server 112 or alert originator 114 may include a mainframe computer, a computer with a reduced instruction set computing (RISC) architecture, a computer with a complex instruction set computing (CISC) architecture, or a computer running a Unix (e.g. Advanced Interactive eXecutive (AIX), Berkeley Software Distribution (BSD), Solaris, Linux, Hewlett-Packard UniX (HP-UX)), Windows, or OS/390 operating system.

Communication access device 104 may include any device capable of wirelessly communicating with unmanned vehicle 102. For example, communication access device 104 may comprise satellite system 106. Satellite system 106 may include a ground station to transmit an alert and an orbital satellite to receive the alert and, in turn, transmit the alert to unmanned vehicle 102. As another example, communication access device 104 may include terrestrial radio transmitter 108, such as, for example, those capable of transmitting an amplitude modulation (AM), frequency modulation (FM), or National Oceanic and Atmospheric Administration (NOAA) weather band frequency audio signal or very high frequency (VHF) or ultra high frequency (UHF) frequency television signal. Terrestrial radio transmitter 108 may be stationary or mobile. As yet another example, communication access device 104 may include cellular network 110. Cellular network 110 may include one or more base stations, which may be any type of device configured to wirelessly interface with a wireless transmit or receive unit (WTRU) to facilitate access to one or more communication networks. By way of example, a base station may be a base transceiver station (BTS), a Node B, an eNode B (eNB), a Home Node B (HNB), a Home eNB, a site controller, an access point (AP), a wireless router, or the like.

Unmanned vehicle 102 may include any type of vehicle capable of operation without a human operator being located on unmanned vehicle 102. Unmanned vehicle 102 may be remote-operated by a human, may be capable of autonomous operation without human control, or a combination thereof. Unmanned vehicle 102 may include a variety of means of locomotion. For example, unmanned vehicle 102 may move with wheels or treads or may move inflight. Unmanned vehicle 102 may be in a fixed-wing configuration (e.g., an airplane) or in a rotary-wing configuration (e.g., a helicopter), including configurations with one or more than one rotors (e.g., a quadcopter). Unmanned vehicle 102 may also be configured such that vertical lift is provided by hot air or a lighter-than-air gas such as helium (e.g., a blimp, zeppelin, or balloon). Unmanned vehicle 102 may include a combination of locomotive means. For example, unmanned vehicle 102 may be configured as a vertical take-off and landing (VTOL) vehicle, which includes aspects of both fixed-wing and rotary-wing configurations. As another example, unmanned vehicle 102 in a blimp configuration may use a lighter-than-air gas to provide vertical lift and one or more vertical rotors to provide horizontal propulsion.

Unmanned vehicle 102 may include equipment, such as communication device 103. Communication device 103 may receive a message from communication access device 104, or otherwise communicate with communication access device 104. For example, communication device 103 may include a satellite dish capable of receiving a message from a satellite of satellite system 106. As another example, communication device 103 may include a radio antenna capable of receiving a message from terrestrial radio transmitter 108. As yet another example, communication device 103 may include a WTRU capable of connecting to and receiving a message from cellular network 110. Communication device 103 may also include a mobile base station that is capable of connecting to and receiving a message from cellular network 110 and also capable of wirelessly interfacing with other WTRUs to relay the message to those WTRUs.

Communication device 103 may also communicate an alert in a message received from communication access device 104 to the recipients in region 116. Communication device 103 may include a radio transmitting antenna capable of communicating, for example, radio frequencies in the AM, FM, and NOAA weather band frequency ranges for radio alerts or radio frequencies in the VHF or UHF frequency ranges for television alerts. Communication device 103 may also be configured to communicate, via a wired or wireless connection, with equipment or a component of unmanned vehicle 102.

Communication device 103 may include a transmitter capable of communicating a cellular signal, such as a mobile base station. A mobile base station may be configured to transmit or receive wireless signals within a particular geographical region, which may be referred to as a cell. A cell may coincide with region 116. A cell may also be smaller than region 116 so that the cell is completely encircled by region 116. Or a cell may also overlap region 116 such that a portion of the cell is within region 116 and a portion of the cell is outside region 116. Communication device 103 may also include a cell broadcast center (CBC) capable of communicating, alone or in conjunction with mobile base station on unmanned vehicle 102, a short message service cell broadcast (SMS-CB).

Communication device 103 may operate to transmit equally in all directions, transmit primarily in one direction at the complete or partial expense of one or more other directions, a combination of the aforementioned, or the like.

Unmanned vehicle 102 and communication device 103 may include a processor communicatively coupled to a memory, discussed further elsewhere herein.

Also depicted in FIG. 1 is region 116. Region 116 may include any geographical area. Region 116 shown in FIG. 1 is a circular shape, but region 116 may be in any shape, regular or irregular. As an illustration, region 116 may be defined by an area in which a disaster or emergency (e.g., a hurricane, earthquake, or tornado) has occurred. Such a definition of region 116 may be determined by a government emergency services agency or a weather monitoring service, for example. Region 116 may also be defined according to political or geographic boundaries. For example, region 116 may include the geographical area comprising a city or county.

Figure 2:
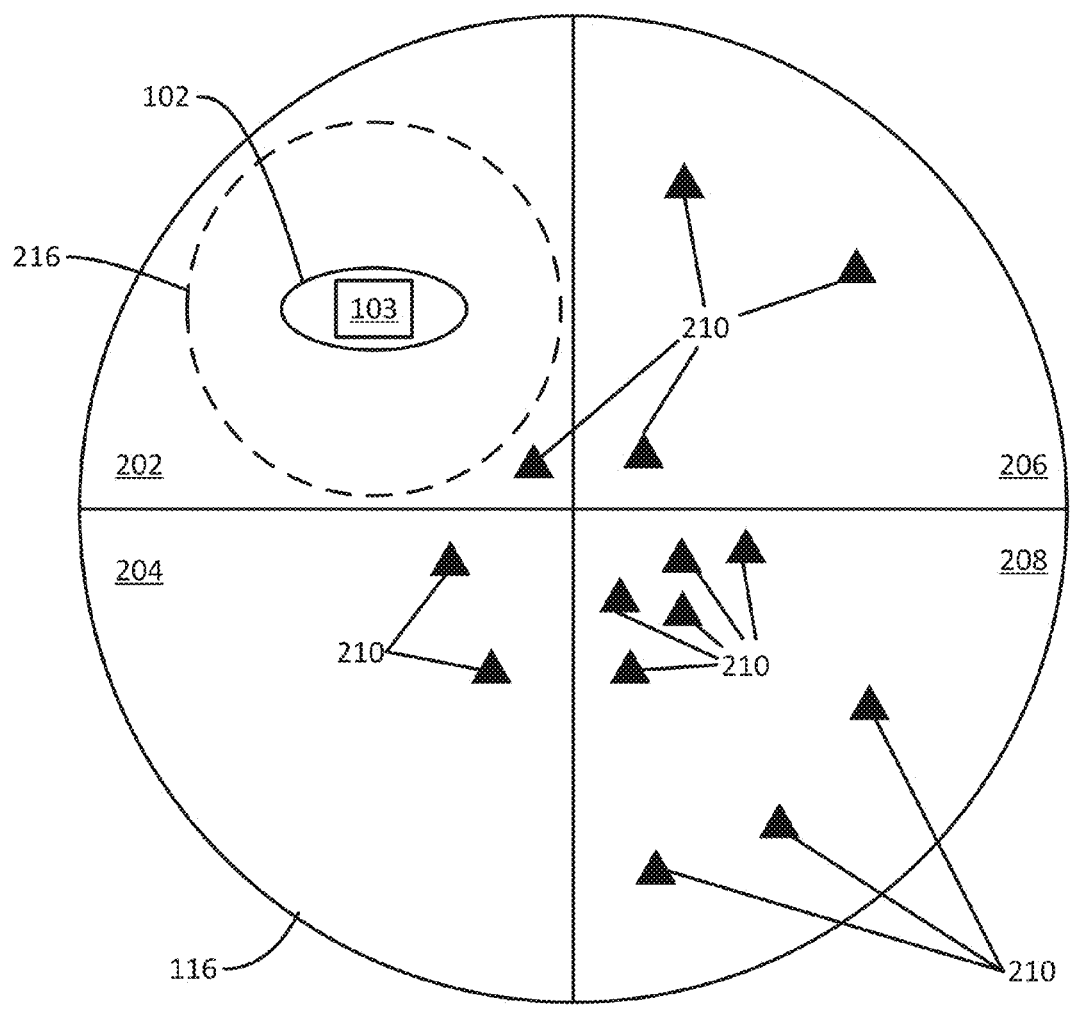
FIG. 2 illustrates an exemplary region in which an unmanned vehicle may communicate an alert.

FIG. 2 depicts a close-up of exemplary region 116 with unmanned vehicle 102 within region 116. Region 116 may comprise a plurality of sub-regions, such as sub-region quadrants 202, 204, 208, and 206. While FIG. 2 depicts a sub-region as a quadrant of circular region 116, a sub-region may comprise any portion of region 116 and be in any shape. FIG. 2 also depicts a plurality of reception devices 210. Reception device 210 may comprise a television, radio, weather radio, WTRU (e.g., cellular phone, laptop computer, tablet computer, smartphone, pager, or the like), or any other device capable of receiving an alert communicated by unmanned vehicle 102. Reception device 210 may be associated with one or more individuals or other entities. It should be appreciated that reception device 210 and unmanned vehicle 102 may be distinct and separate objects (e.g., not mechanically connected).

Unmanned vehicle 102 will inevitably only be able to communicate an alert within a finite geographical region due to the technical limitations of communication device 103 on unmanned vehicle 102. For example, a television broadcast from a unidirectional television radio transmitter may only be reasonably received within a radius of, for example, 20 miles from the transmitter. Similarly, in the context of cellular communication, this finite geographical region coincides with the cell of a base station. In other words, those WTRUs within the cell of a base station may receive or transmit a wireless signal with the base station. The finite geographical region in which communication device 103—and by extension unmanned vehicle 102—can communicate with a recipient device is shown in FIG. 2 as 216 and is hereinafter referred to as effective communication region 216. Effective communication region 216 may be equal, larger, or smaller (as depicted in FIG. 2) than region 116. Effective communication region 216 may coincide with, enclose, overlap with, or be enclosed by (as depicted in FIG. 2) region 116. Effective communication region 216 may be any shape, such as circular (as depicted in FIG. 2), triangular, or conical. A circular shape of effective communication region 216 may commonly result from a unilateral transmitter as communication device 103. On the other hand, a triangular or conical shape may commonly result from a directional transmitter as communication device 103. Since unmanned vehicle 102 may include more than one communication device 103, which may have different communication attributes, it should be noted that unmanned vehicle 102 may have more than one effective communication region 216.

Figure 3:
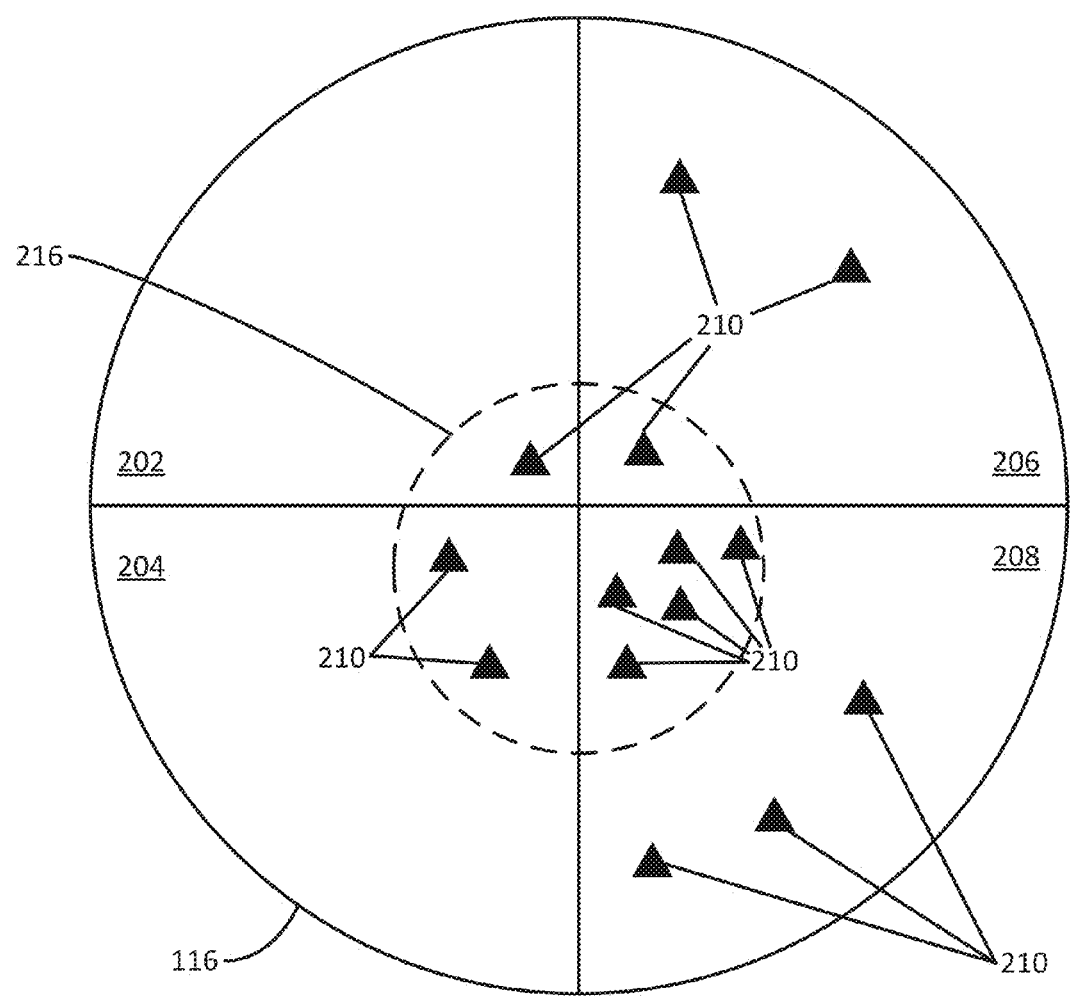
FIG. 3 illustrates an exemplary region in which an unmanned vehicle may communicate an alert.

FIG. 3 depicts another close-up of exemplary region 116, including a plurality of reception devices 210 and effective communication region 216 of unmanned vehicle 102 (not shown in FIG. 3). The division into sub-region quadrants 202, 204, 206, and 208 is shown for comparative purposes.

Figure 4:
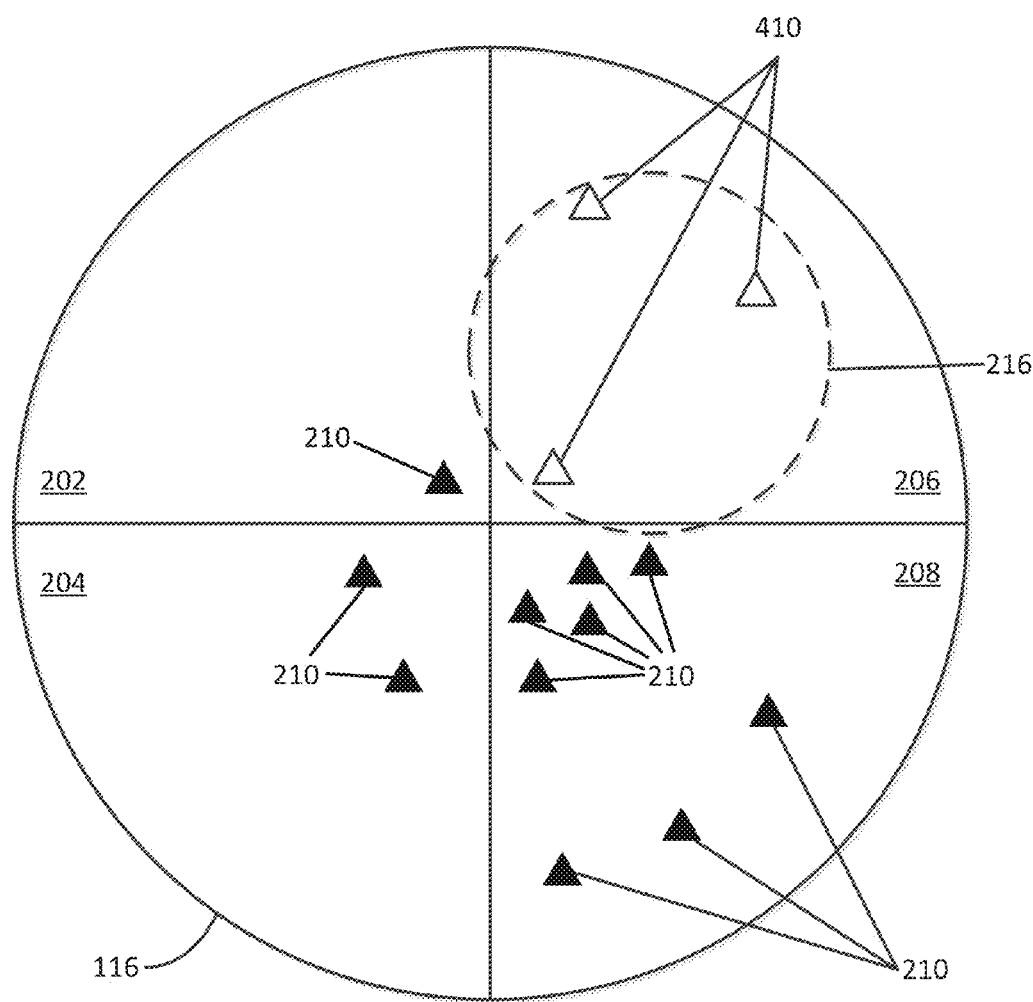
FIG. 4 illustrates an exemplary region in which an unmanned vehicle may communicate an alert.

FIG. 4 depicts another close-up of exemplary region 116, including a plurality of reception devices 210 and effective communication region 216 of unmanned vehicle 102 (not shown in FIG. 4). The division into sub-region quadrants 202, 204, 206, and 208 is shown for comparative purposes. FIG. 4 is similar to FIG. 2 and FIG. 3; however FIG. 4 includes several priority reception devices 410. Priority reception devices 410 may include those reception devices for which receiving an alert may be a priority over other reception devices 210. A priority reception device 410 may be associated with a priority individual. Example priority reception devices 410 may include a reception device associated with a government official, emergency service personnel, or medical personnel. It should be appreciated that there may be more than one level of priority of priority reception devices 410. For example a priority reception device 410 associated with a mayor, police chief, or fire department chief may be a higher priority level than a priority reception device 410 associated with a respective low-level government bureaucrat, police office, or firefighter.

Figure 5:
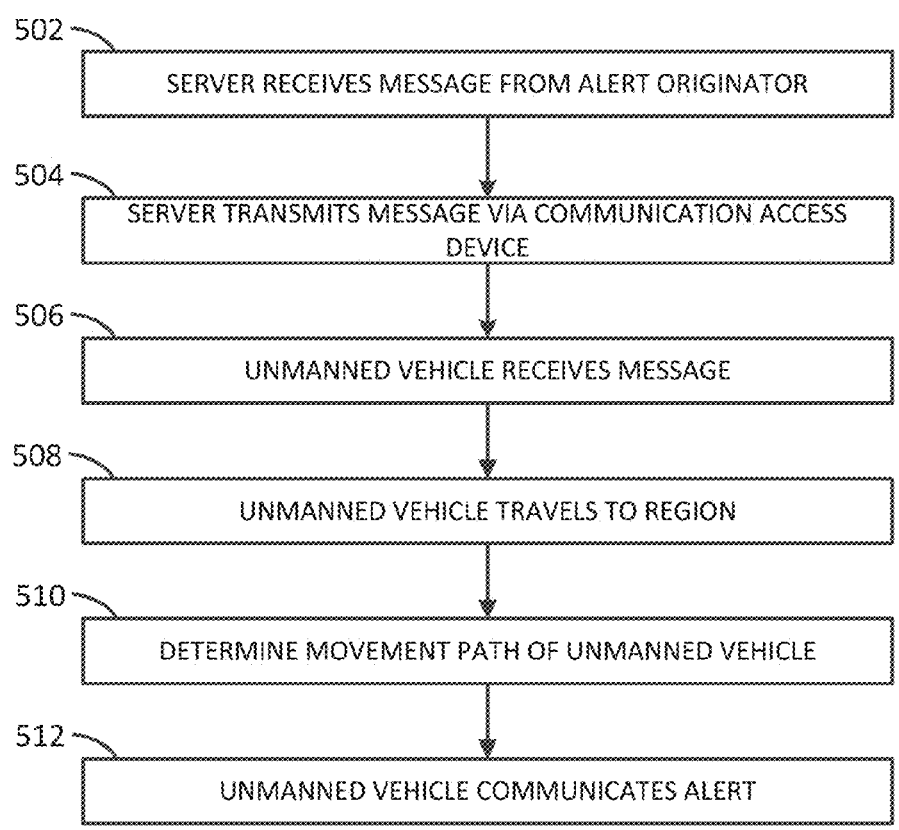
FIG. 5 illustrates an exemplary method for communicating an alert via an unmanned vehicle.

FIG. 5 illustrates exemplary method 500 for communicating an alert via an unmanned vehicle.

At block 502, server 112 may receive a message from alert originator 114. As one example, alert originator 114 may be operated by a governmental emergency services agency (e.g., FEMA), weather observation agency (e.g., NOAA), or the like. The message of block 502 may include an alert. An alert may include a communication relating to an event or an indication of an event. An event may include an emergency event such as a natural disaster (e.g., hurricane, tornado, fire, flood, or earthquake) or a man-made disaster (e.g., terrorist attack, gunman attack, or child abduction). An event may also include a special event, such as a concert, soccer game, other entertainment event, or the like. An event may be a past event, an on-going event, or a future event (e.g., a hurricane is heading towards an area). An exemplary alert is a Wireless Emergency Alert (WEA) authorized by FEMA. To illustrate, an alert may include information about the magnitude of a recently-occurred earthquake and the locations of emergency relief stations. As another illustration, an alert may include evacuation instructions preceding a large wildfire entering an area. An alert may be comprised of audio (e.g., a radio alert), video (e.g., a television alert), or text (e.g., a short message service (SMS) text message). An alert may also include an associated severity level or priority level. An alert may be associated with region 116, to which the alert should be broadcast. For example, an alert concerning an earthquake in a certain city may be associated with region 116 encompassing the city.

The message of block 502 may include a set of coordinates defining the borders of region 116. The message of block 502 may also include a set of coordinates defining the center and radial distance of a region 116 that is circular region. The message of block 502 may also include other information associated with region 116. For example, the message of block 502 may include a mapping of population concentrations or reception devices 410 throughout region 116. The message of block 502 may also include the location of certain individuals within region 116 or the location of their respective reception devices 410. As another example, the message of block 502 may include topographical information detailing elevations and geographical features in region 116.

At block 504, server 112 may transmit a message that includes some or all the information from the message of block 502 to unmanned vehicle 102 via communication access device 104. As further discussed herein, communication access device 104 may include satellite system 106, terrestrial radio transmitter 108, or cellular network 110, among other things. The message of block 502 may be sent via communication access device 104 based on the information within the message of block 502. For example, if the message of block 502 includes an alert with regard to an event, it may be sent via terrestrial radio transmitter 108, while the message including topographical information (without an alert with regard to an event) may be sent via cellular network 110.

At block 506, unmanned vehicle 102 may receive a message that includes some or all of the information from the message of block 502 transmitted via communication access device 104 from server 112. Unmanned vehicle 102 may receive the message using communication device 103. In the case of satellite system 106, unmanned vehicle 102 may receive the message using communication device 103 comprising a satellite dish or other type of antenna to receive a message from a satellite in satellite system 106. Unmanned vehicle 102 may merely receive the message as part of a communication from a satellite in satellite system 106 or may establish a communication link with a satellite in satellite system 106 wherein a message is included in an ongoing communication between unmanned vehicle 102 and the satellite in satellite system 106. In the case of terrestrial radio transmitter 108, unmanned vehicle 102 may receive an alert via communication device 103, which may comprise a radio or television antenna. In the case of cellular network 110, unmanned vehicle 102 may receive an alert via communication device 103, which may comprise a WTRU or other device capable of communication with cellular network 110. It should be appreciated that a WTRU or other device capable of communication with cellular network 110 may establish a persistent connection with cellular network 110 and a received message may be just one of many communications from cellular network 110.

At block 508, unmanned vehicle 102 may travel towards region 116 based on some or all of the information associated with region 116 included in the message of block 502 or based on information associated with region 116 provided by another source, such as server 112. Unmanned vehicle 102 may travel to an outer border of region 116 or may travel to a predefined location within region 116, such as the center of region 116 that is circular. Unmanned vehicle 102 may also travel to a location wherein unmanned vehicle's 102 effective communication region 216 includes at least a portion of region 116, without unmanned vehicle 102 entering region 116. It should be noted that in a case where unmanned vehicle 102 is already within region 116 or where a portion of effective communication region 216 is within region 116, such as when unmanned vehicle 102 has already communicated an alert in region 116, unmanned vehicle may not need to travel towards region 116.

As unmanned vehicle 102 travels towards region 116, a determination may be made that unmanned vehicle 102 is proximate to region 116 or within communication range of region 116. The determination may include monitoring the location of unmanned vehicle 102 using, for example, information from a global positioning system (GPS), radar, or other system capable of providing information on the location of unmanned vehicle 102. The determination may be performed by unmanned vehicle 102, an apparatus thereon, server 112, or any other system or apparatus communicatively connected to unmanned vehicle 102. The determination that unmanned vehicle 102 is proximate to region 116 or within communication range of region 116 may include a determination that unmanned vehicle 102 is within region 116. It may also include a determination that a portion of effective communication region 216 of unmanned vehicle 102 is within region 116.

At block 510, a movement path of unmanned vehicle 102 to communicate a message may be determined according to one or more factors. This determination may be performed by unmanned vehicle 102 or server 112. It should be noted that a movement path includes movement in three dimensions, including altitude. It should also be noted that a movement path also includes an absence of movement, such as when unmanned vehicle 102 remains stationary.

Unmanned vehicle 102 may communicate an alert within region 116 by remaining stationery or relatively stationary within region 116 or by moving within region 116. Whether and where unmanned vehicle 102 moves within region 116 may be dictated by several factors. One such factor is effective communication region 216 of communication device 103 on unmanned vehicle 102. If effective communication region 216 is equal to or larger than region 116 and region 116 is within effective communication region 216, then unmanned vehicle 102 may remain relatively stationary so that its effective communication region 216 covers the entire region 116. In this capacity, unmanned vehicle 102 in a rotary-wing configuration may be particularly suitable with its ability to hover in a single location. On the other hand, if effective communication region 216 is smaller than region 116 or effective communication region 216 is not able to enclose region 116, unmanned vehicle 102 may have to move within region 116 in order to communicate alerts to the entirety of region 116. FIG. 2 shows such an exemplary case. Unmanned vehicle 102 in FIG. 2 would have to move throughout the four sub-region quadrants labeled as 202, 204, 206, and 208 in order to provide coverage to the entirety of region 116.

The characteristics of unmanned vehicle 102 and its communication device 103 may also be a factor in determining a movement path of unmanned vehicle 102 within region 116. For example, since unmanned vehicle 102 in a rotary-wing configuration is adept at hovering and less adept at traveling quickly over distances, unmanned vehicle 102 in a rotary-wing configuration may favor a movement path where unmanned vehicle 102 remains relatively stationary and provides persistent communication of alerts to a sub-region of region 116 that is within its effective communication region 216. Conversely, unmanned vehicle 102 in a fixed-wing configuration is more adept at traveling over distances and cannot hover at all. Therefore, unmanned vehicle 102 in a fixed-wing configuration may favor a movement path in region 116 where unmanned vehicle traverses all or most of region 116, communicating alerts to those within its effective communication region 216 as it flies by. The characteristics of unmanned vehicle 102, such as its size and flight capabilities, may also be a factor. For example, unmanned vehicle 102 that is in a rotary-wing configuration and that is very small, such as the size of a bird, will likely not be able to operate at a high altitude and thus limit the size of its effective communication region 216, which in turn affects other alert communication and movement path determinations described herein. On the other hand, unmanned vehicle 102 that is in a fixed-wing configuration and that is near the size of a small passenger airplane will likely be able to operate at relatively high altitudes and thus might have a larger effective communication region 216.

Communication device 103 may also have characteristics which affect the determination of a movement path of unmanned vehicle 102 in communicating an alert. For example, communication device 103 comprising a radio transmitter may excel at horizontal transmission but only have limited vertical transmission capabilities. Unmanned vehicle 102 equipped with such communication device 103 may have to fly lower to the ground in order to effectively communicate an alert. As another example, unmanned vehicle 102 with communication device 103 comprising a base station to communicate a cellular alert may have to move slowly or not at all in order for WTRUs within effective communication region 216 to connect to the base station.

Another factor bearing on a determination of a movement path of unmanned vehicle 102 within region 116 may include the distribution of reception devices 210 or individuals associated with those reception devices 210 within region 116. Unmanned vehicle 102 may move within region 116 so that its effective communication region 216 is able to communicate an alert, for example, to the largest number of reception devices 210 possible. This may be accomplished by dividing region 116 into a plurality of sub-regions and determining which sub-region has the most reception devices 210. As an illustration, region 116, depicted in FIG. 2, is divided into four sub-region quadrants labeled 202, 204, 206, and 208. Sub-region quadrant 202 includes one reception device 210. Sub-region quadrant 204 includes two reception devices 210. Sub-region quadrant 206 includes three reception devices 210. Sub-region quadrant 208 includes eight reception devices 210. Since sub-region quadrant 208 includes the most reception devices 210, unmanned vehicle 102 may move to sub-region quadrant 208 and communicate an alert to reception devices 210 in sub-region quadrant 208. Depending on effective communication region 216 (discussed above), unmanned vehicle 102 may move throughout sub-region quadrant 208 to communicate an alert or remain stationary in a location within sub-region quadrant 208 so that reception devices 210 in sub-region quadrant 208 simultaneously communicate the alert.

As another example of determining a movement path of unmanned vehicle 102 within region 116 to communicate to the largest number of reception devices 210 possible, unmanned vehicle 102 may move to a location so that its effective communication region 216 covers as many reception devices 210 as possible. This is in contrast to determining the number of reception devices 210 in each sub-region of region 116 and simply moving to that sub-region to communicate an alert to those reception devices 210 in that sub-region, as described above. As an illustration, FIG. 3 depicts a concentration of reception devices 210, including one or more from each of sub-region quadrants 202, 204, 206, and 208, around the center of region 116. As illustrated in FIG. 3, unmanned vehicle 102 and its effective communication region 216 may be positioned so that nine reception devices 210 may come within effective communication region 216 and, therefore, receive communicate alerts. This movement path is also obviously affected by the size and shape of effective communication region 216.

Another factor bearing on a movement path of unmanned vehicle 102 within region 116 may include a priority level of a message, which may include an alert. For example, an alert may be of high importance to government officials and emergency personnel and ensuring that priority reception devices 410 associated with these personnel receive a high priority level alert takes precedent over the alert being sent to the reception devices 210 associated with the population at-large. For example, FIG. 4 shows a similar distribution of reception devices 210 in region 116 as in FIG. 2 and FIG. 3. However, the three in sub-region quadrant 206 are now priority reception devices 410. Instead of moving to more populated areas in sub-region quadrant 208 or towards the center of region 116, as discussed above, unmanned vehicle 102 may move so that effective communication region 216 covers each of the three priority reception devices 410. As another example, a priority level may indicate a negative priority, such that it would be undesirable to communicate an alert to priority reception device 410. In this case, unmanned vehicle 102 may move to a sub-region of region 116 that does not contain priority reception device 410 with a negative priority level and communicate the alert to reception devices 210 in that sub-region.

It should be appreciated that the aforementioned factors may be combined in determining a movement path of unmanned vehicle 102 to communicate an alert within region 116. For example, in a scenario where there is multiple priority reception devices 410 spread over an area larger than unmanned vehicle's 102 effective communication region 216, unmanned vehicle 102 may move so that its effective communication region 216 covers as many of the priority reception devices 410 as possible.

At block 512, unmanned vehicle 102 may communicate a message within region 116, which may include an alert. Unmanned vehicle 102 may communicate an alert using communication device 103 on or within unmanned vehicle 102, as described further herein. Unmanned vehicle 102 may communicate an alert as an audio radio signal, such as an AM, FM, or weather band audio radio signal, using communication device 103, such as a radio transmitter. Unmanned vehicle 102 may also communicate an alert as a television signal, such as a VHF or UHF television signal, using communication device 103, such as a radio transmitter. A recipient within the region may then receive the audio radio signal with, for example, an AM/FM radio receiver or a weather band capable radio receiver or receive the television signal with, for example, a television.

Unmanned vehicle 102 may communicate an alert within region 116 as a cellular alert, wherein a recipient may receive the alert using a WTRU. A cellular alert may be communicated by unmanned vehicle 102 with communication device 103, such as a mobile base station. A mobile base station on unmanned vehicle 102 may establish a cell within region 116 within which WTRUs may then connect to the mobile base station. The mobile base station on unmanned vehicle 102 may then transmit an alert to a connected WTRU. The alert may be transmitted as an SMS point-to-point text message (e.g., directed to one particular WTRU phone number) or as an SMS cellular broadcast text message (e.g., directed to all WTRUs within the cell).

Figure 6:
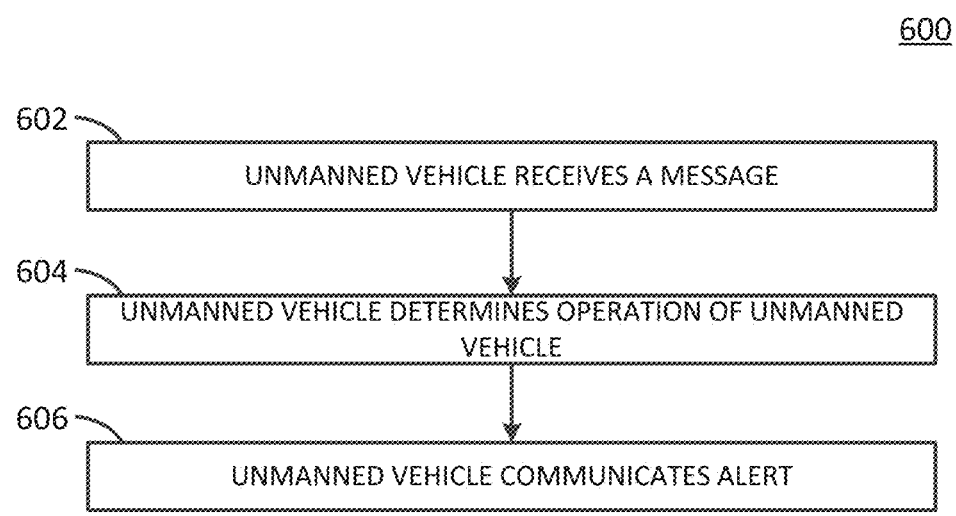
FIG. 6 illustrates an exemplary method for communicating an alert via an unmanned vehicle.

FIG. 6 illustrates method 600 for unmanned vehicle 102 to communicate an alert. At block 602, unmanned vehicle 102 may receive a message, similar to the message of block 502, which may include an alert and information associated with region 116. At block 604, unmanned vehicle 102 may determine the operation of unmanned vehicle 102, such as its movement path, based on one or more factors such as a characteristic of communication device 103, information associated with region 116, or a distribution of reception devices 210 within region 116. At block 606, unmanned vehicle 102 may communicate an alert via communication device 103.

Figure 7:
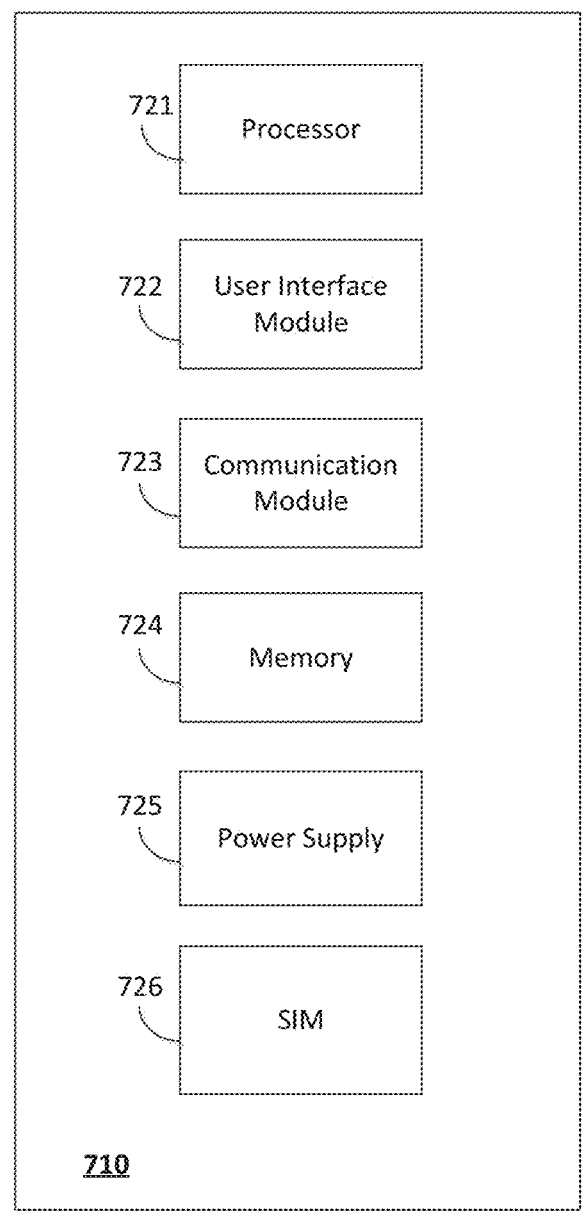
FIG. 7 is a block diagram of an example device via which aspects of communicating an alert via an unmanned vehicle may be facilitated.

FIG. 7 illustrates an example wireless device 710 (e.g., WTRU) that may be used in connection with communicating an alert via an unmanned vehicle. References will also be made to other figures of the present disclosure as appropriate. For example, unmanned vehicle 102, communication device 103, reception device 210, and priority reception device 410 may include a wireless device of the type described in regard to FIG. 7, and may have some, all, or none of the components and modules described in regard to FIG. 7. It will be appreciated that the components and modules of wireless device 710 illustrated in FIG. 7 are illustrative, and that any number and type of components and/or modules may be present in wireless device 710. In addition, the functions performed by any or all of the components and modules illustrated in FIG. 7 may be performed by any number of physical components. Thus, it is possible that in some configurations the functionality of more than one component and/or module illustrated in FIG. 7 may be performed by any number or types of hardware or hardware and software.

Processor 721 may be any type of circuitry that performs operations on behalf of wireless device 710. Such circuitry may include circuitry and other components that enable processor 721 to perform any of the functions and methods described herein. Such circuitry and other components may also enable processor 721 to communicate and/or interact with other devices and components, for example any other component of wireless device 710, in such a manner as to enable unmanned vehicle 102, communication device 103, reception device 210, and priority reception device 410 and such other devices and/or components to perform any of the disclosed functions and methods. In an example configuration, processor 721 executes software (e.g., computer readable instructions stored in a computer readable medium) that may include functionality related to communicating an alert via an unmanned vehicle, for example. User interface module 722 may be any type or combination of hardware and software that enables a user to operate and interact with wireless device 710, and, in an example configuration, to interact with a system enabling the user to place, request, and/or receive calls, text communications of any type, voicemail, voicemail notifications, voicemail content and/or data, and/or a system. For example, user interface module 722 may include a display, physical and/or "soft" keys, voice recognition software, a microphone, a speaker and the like. Wireless communication module 723 may be any type of transceiver including any combination of hardware and software that enables wireless device 710 to communicate with wireless network equipment. Memory 724 enables wireless device 710 to store information, such as an alert or information associated with a region. Memory 724 may take any form, such as internal random access memory (RAM), an SD card, a microSD card and the like. Power supply 725 may be a battery or other type of power input (e.g., a charging cable that is connected to an electrical outlet, etc.) that is capable of powering wireless device 710. SIM 726 may be any type Subscriber Identity Module (SIM) and may be configured on a removable or non-removable SIM card that allows wireless device 710 to store data on SIM 726.

Figure 8:
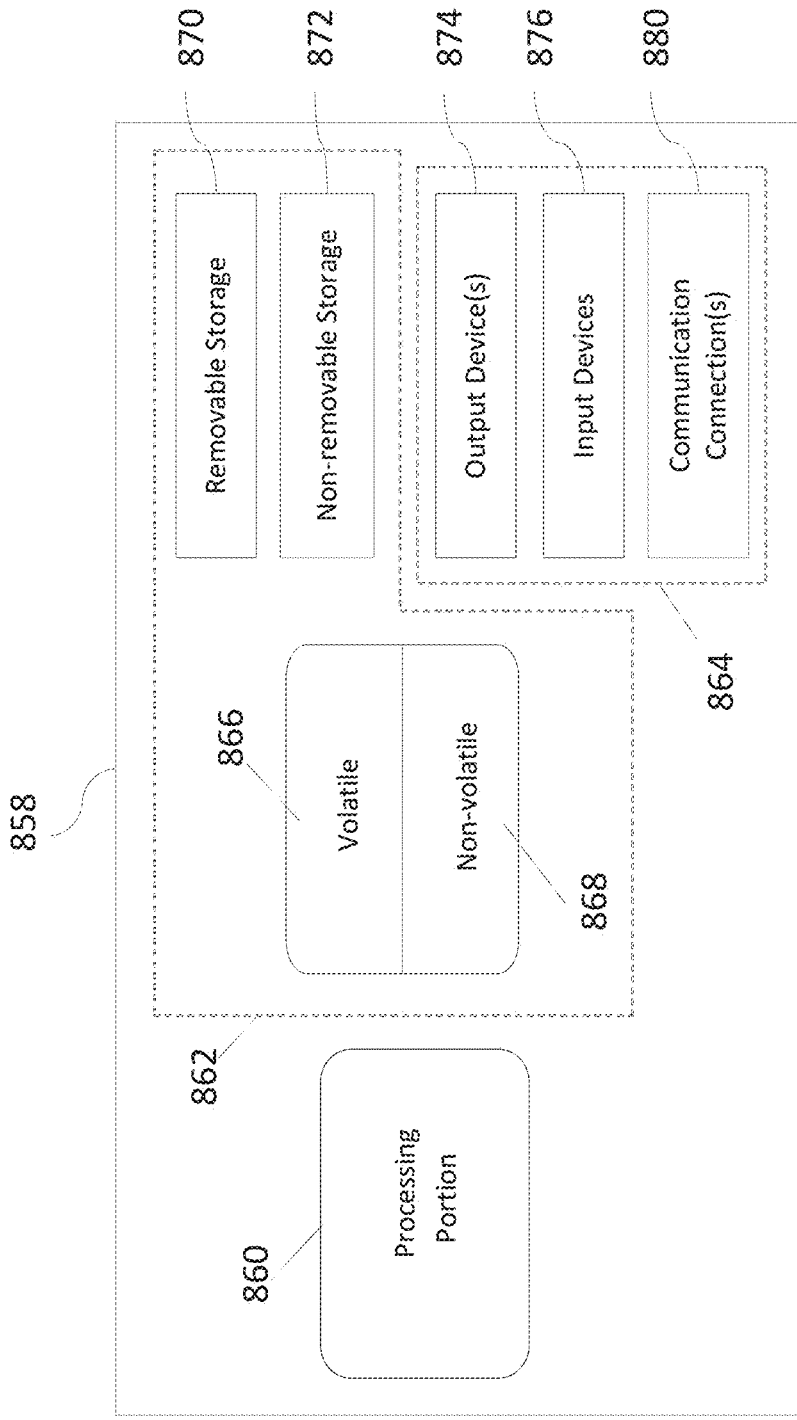
FIG. 8 is a block diagram of an example processor via which aspects of communicating an alert via an unmanned vehicle may be facilitated.

FIG. 8 is a block diagram of an example processor 858 in which communicating an alert via an unmanned vehicle may be implemented. Processor 858 may be employed in any of the examples described herein, including as one or more components of unmanned vehicle 102, server 112, communication access device 104, satellite system 106, terrestrial radio transmitter 108, cellular network 110, and alert originator 114, a WTRU, communication device 103, reception device 210, priority reception device 410, and/or as one or more components of any third party system or subsystem that may implement any portion of the subject matter described herein. It is emphasized that the block diagram depicted in FIG. 8 is exemplary and not intended to imply a specific implementation. Thus, the processor 858 may be implemented in a single processor or multiple processors. Multiple processors may be distributed or centrally located. Multiple processors may communicate wirelessly, via hard wire, or a combination thereof. Processor 858 may include circuitry and other components that enable processor 858 to perform any of the functions and methods described herein. Such circuitry and other components may also enable processor 858 to communicate and/or interact with other devices and components, for example any other component of any device disclosed herein or any other device, in such a manner as to enable processor 858 and such other devices and/or components to perform any of the disclosed functions and methods.

As depicted in FIG. 8, the processor 858 comprises a processing portion 860, a memory portion 862, and an input/output portion 864. The processing portion 860, memory portion 862, and input/output portion 864 are coupled together (coupling not shown in FIG. 8) to allow communications between these portions. The input/output portion 864 is capable of providing and/or receiving components, commands, and/or instructions, utilized to, for example, establish and terminate communications sessions, transmit and receive service requests and data access request data and responses, transmit, receive, store and process text, data, and voice communications, execute software that efficiently receives and processes media requests, transmit media, and/or perform any other function described herein.

The processor 858 may be implemented as a client processor and/or a server processor. In a basic configuration, the processor 858 may include at least one processing portion 860 and memory portion 862. The memory portion 862 may store any information utilized in conjunction with establishing, transmitting, receiving, and/or processing text, data, media, and/or voice communications, communications-related data and/or content, voice calls, other telephonic communications, etc. For example, the memory portion is capable of storing media content, such as video media files, audio media files, and text media files. Depending upon the exact configuration and type of processor 858, the memory portion 862 may be volatile (such as RAM) 866, non-volatile (such as ROM, flash memory, etc.) 868, or a combination thereof. The processor 858 may have additional features/functionality. For example, the processor 858 may include additional storage (removable storage 870 and/or non-removable storage 872) including, but not limited to, magnetic or optical disks, tape, flash, smart cards or a combination thereof. Computer storage media, such as memory and storage elements 862, 870, 872, 866, and 868, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 858. Any such computer storage media may be part of the processor 858 and is not a transient signal.

The processor 858 may also contain the communications connection(s) 880 that allow the processor 858 to communicate with other devices, for example through a radio access network (RAN). Communications connection(s) 880 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media, wherein storage media is not a transient or propagated signal. A computer-readable storage medium, as described herein is an article of manufacture having a concrete, tangible, physical structure, and thus, not to be construed as a propagating signal. Any computer-readable storage medium described herein is not to be construed as a signal. Any computer-readable storage medium described herein is to be construed as an article of manufacture having a concrete, tangible, physical structure. The processor 858 also may have input device(s) 876 such as keyboard, keypad, mouse, pen, voice input device, video input device, touch input device, etc. Output device(s) 874 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how machine-to-machine autonomous media delivery may be implemented with stationary and non-stationary network structures and architectures in order to communicate an alert via an unmanned vehicle. It can be appreciated, however, that communicating an alert via an unmanned vehicle as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1 Evolution Data Optimized (EVDO), Code Division Multiple Access-2000 (cdma2000 3), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, communicating an alert via an unmanned vehicle may be applied independently of the method of data transport and does not depend on any particular network architecture or underlying protocols.

Figure 9:
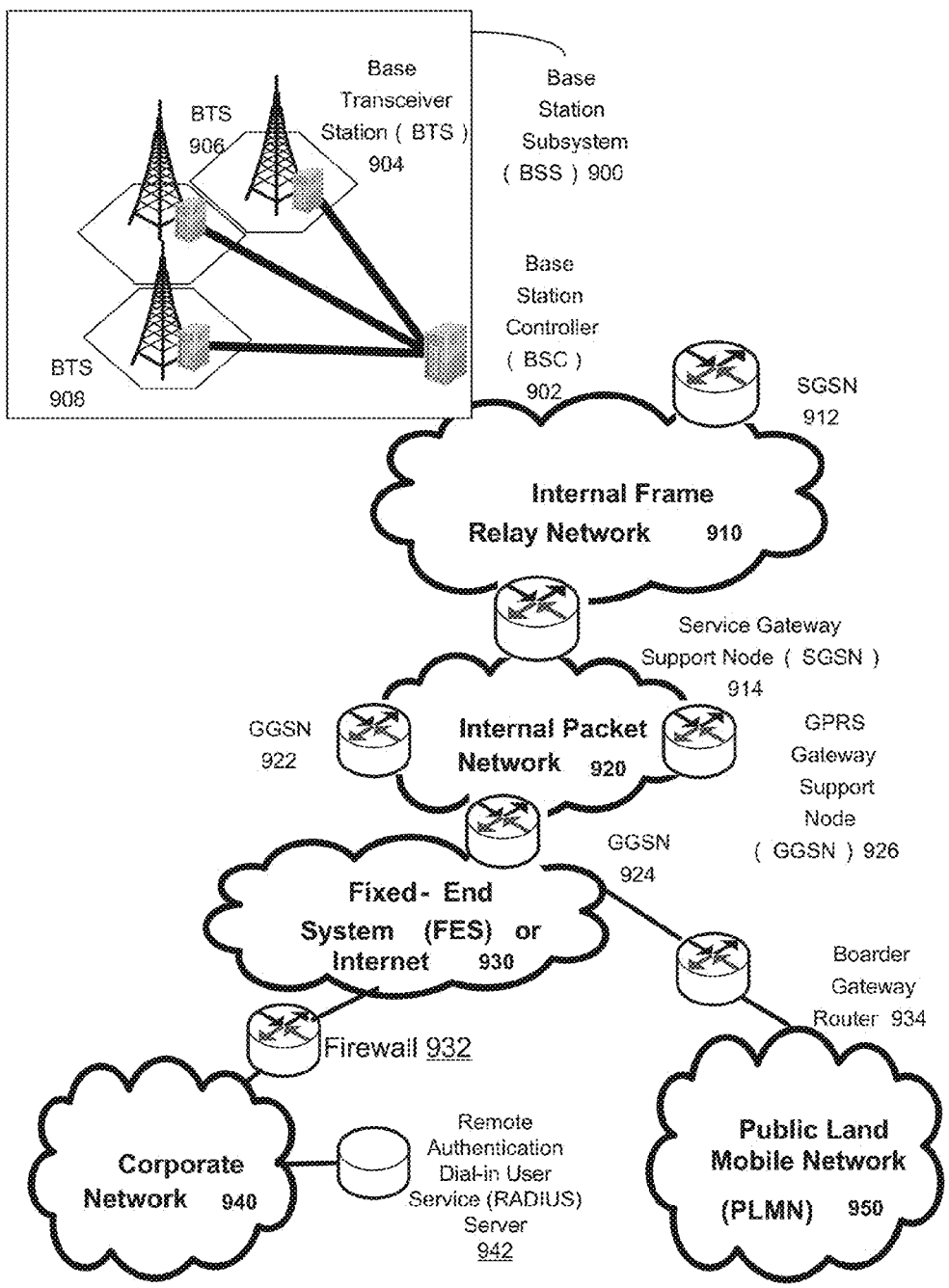
FIG. 9 is a block diagram of a non-limiting exemplary packet-based mobile cellular network environment, such as a GPRS network, which may be utilized to facilitate unmanned vehicle communications.

FIG. 9 depicts an overall block diagram of an exemplary packet-based mobile cellular network environment, such as a GPRS network, in which apparatuses, systems, and methods for communicating an alert via an unmanned vehicle such as those described herein may be practiced. In an example configuration, any RAN as described herein may be encompassed by or interact with the network environment depicted in FIG. 9. Similarly, wireless-enabled devices, such as unmanned vehicle 102, a WTRU, communication device 103, reception device 210, or priority reception device 410 may communicate or interact with a network environment such as that depicted in FIG. 9. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., unmanned vehicle 102, a WTRU, communication device 103, reception device 210, or priority reception device 410) become connected to the wireless network. In exemplary fashion, the packet traffic originating from user devices (e.g., unmanned vehicle 102, a WTRU, communication device 103, reception device 210, or priority reception device 410) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 10:
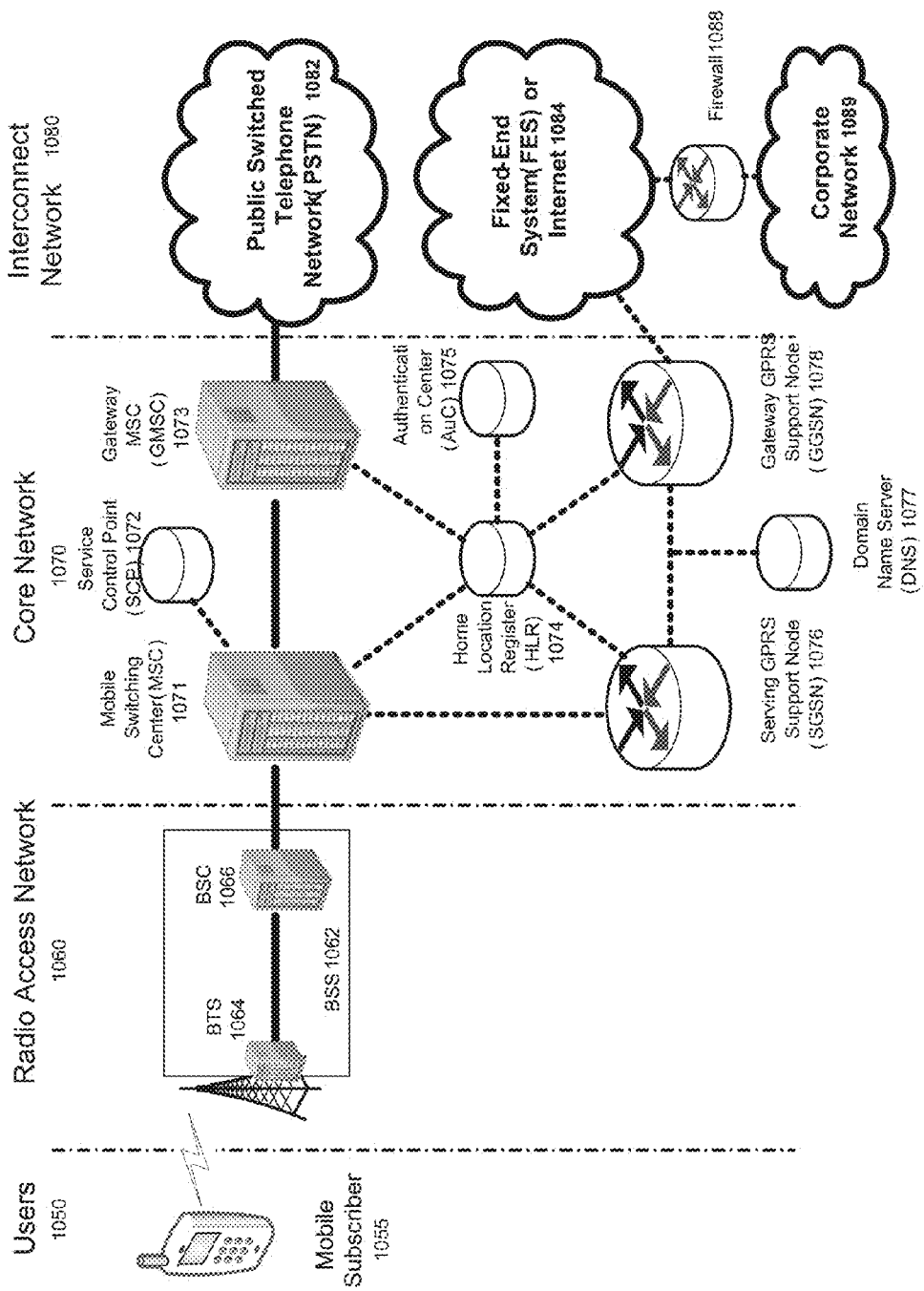
FIG. 10 illustrates a non-limiting exemplary architecture of a typical GPRS network, segmented into four groups, which may be utilized to facilitate unmanned vehicle communications.

FIG. 10 illustrates an example architecture of a GPRS network in which one or more disclosed examples of communicating an alert via an unmanned vehicle may be implemented. The GPRS network depicted in FIG. 10 comprises four groups: users 1050, radio access network 1060, core network 1070, and interconnect network 1080. Users 1050 may comprise a plurality of end users (though only mobile subscriber 1055 is shown in FIG. 10). In an example, the device depicted as mobile subscriber 1055 may comprise any of unmanned vehicle 102, WTRU, communication device 103, reception device 210, or priority reception device 410. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 10, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some examples, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as unmanned vehicle 102, a WTRU, communication device 103, reception device 210, or priority reception device 410, used by an end user of a mobile cellular service or a wireless provider. When a mobile subscriber turns on his or her mobile device, the mobile device may go through an attach process by which the mobile device attaches to an SGSN of the GPRS network. In FIG. 10, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of apparatuses, systems, and methods for communicating an alert via an unmanned vehicle such as those described herein may include, but are not limited to, Gateway GPRS Support Node tables, Fixed End System router tables, firewall systems, VPN tunnels, and any number of other network elements as required by the particular digital network.

Figure 11:
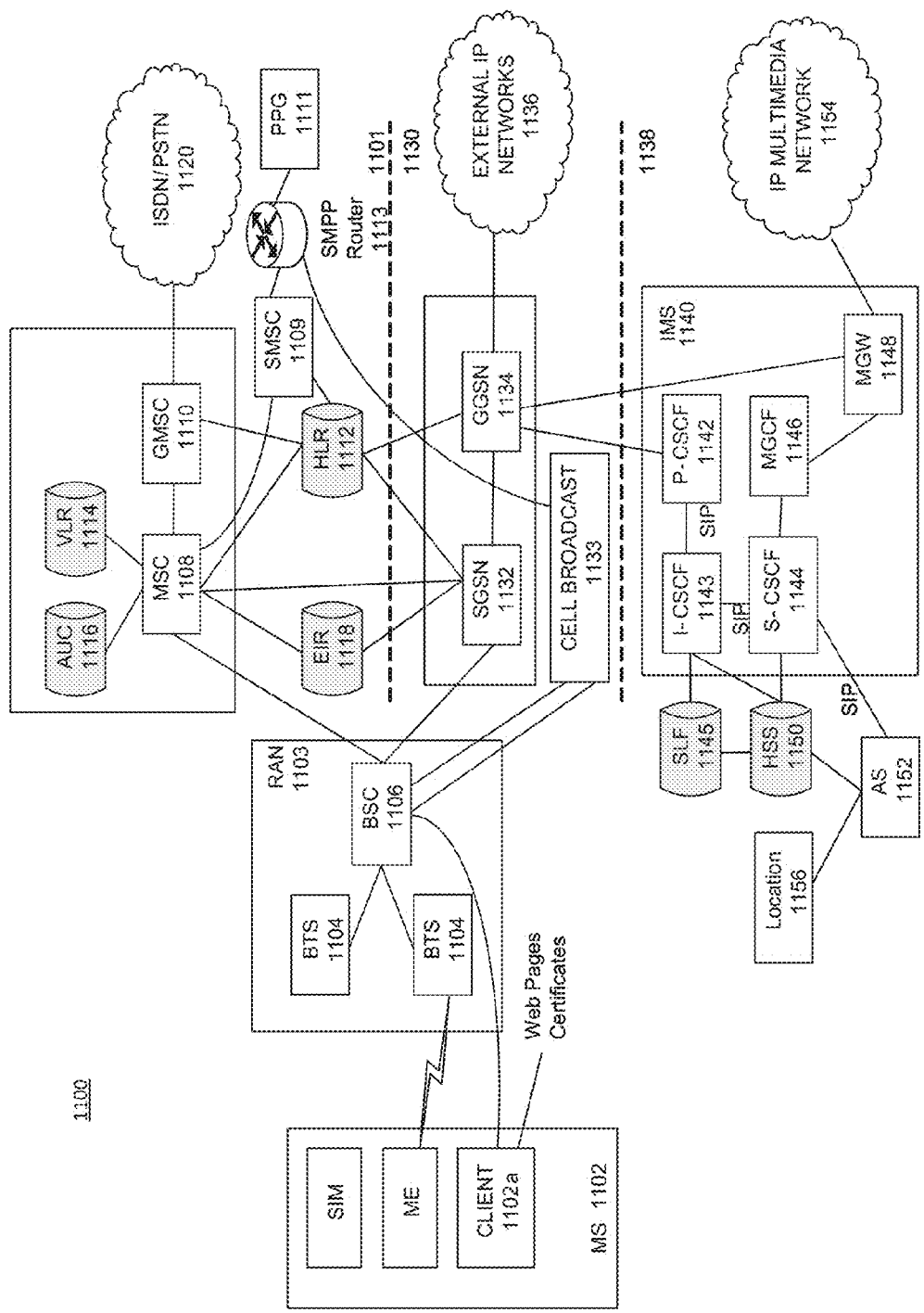
FIG. 11 illustrates a non-limiting alternate block diagram of an exemplary GSM/GPRS/IP multimedia network architecture which may be utilized to facilitate unmanned vehicle communications.

FIG. 11 illustrates another exemplary block diagram view of a GSM/GPRS/IP multimedia network architecture 1100 in which the apparatuses, systems, and methods for communicating an alert via an unmanned vehicle such as those described herein may be incorporated. As illustrated, architecture 1100 of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., unmanned vehicle 102, WTRU, communication device 103, reception device 210, or priority reception device 410) that is used by mobile subscribers, in one example with a Subscriber Identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS.

Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (e.g., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 12:
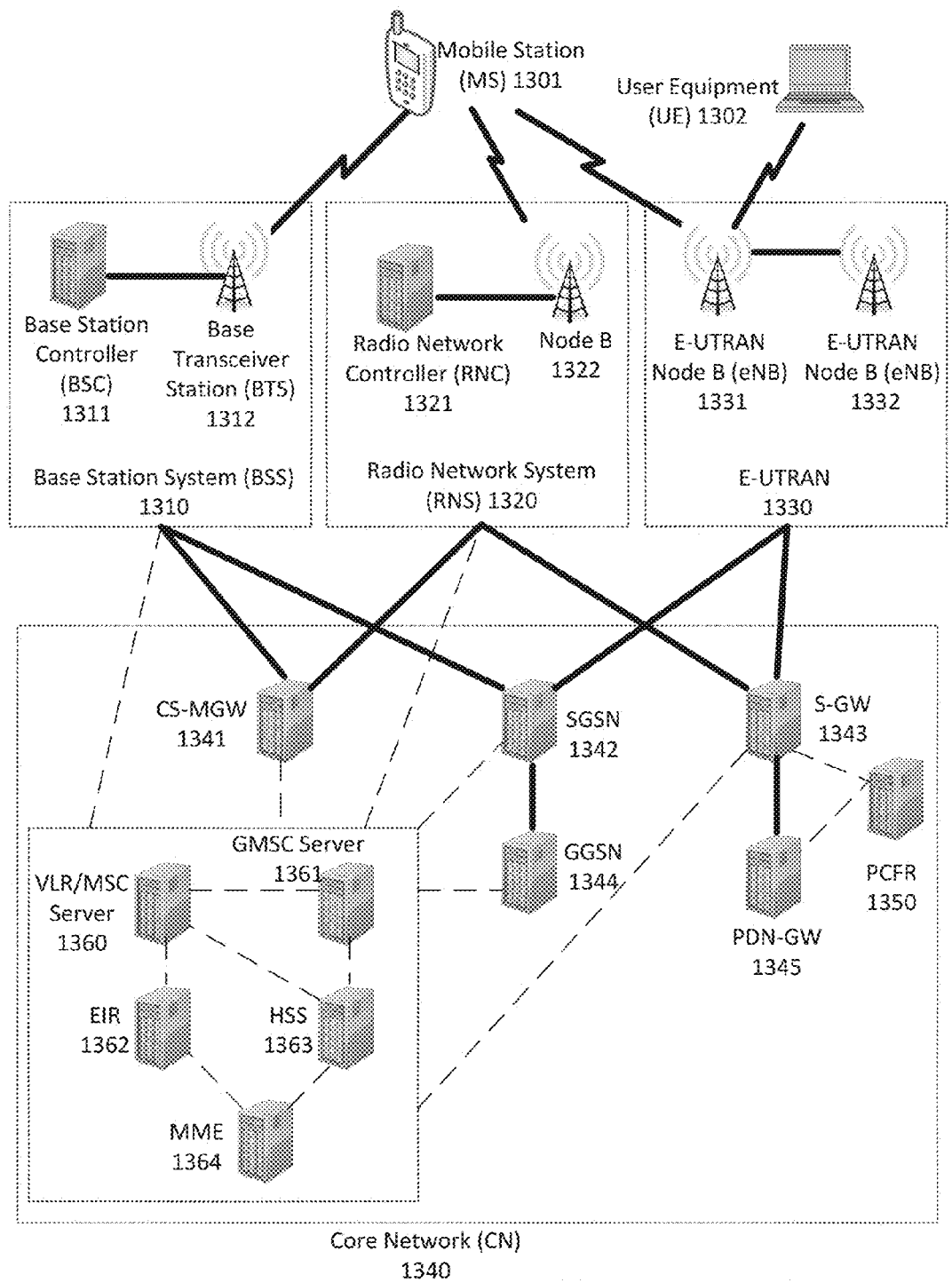
FIG. 12 illustrates a Public Land Mobile Network (PLMN) block diagram view of an exemplary architecture which may be utilized to facilitate unmanned vehicle communications.

FIG. 12 illustrates a PLMN block diagram view of an exemplary architecture in which communicating an alert via an unmanned vehicle may be incorporated. Mobile Station (MS) 1301 is the physical equipment used by the PLMN subscriber. In one illustrative example, unmanned vehicle 102, a WTRU, communication device 103, reception device 210, or priority reception device 410 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 12 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In an illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical example, user equipment may be classified as either "white listed" or "black listed" depending on its status in the network. In one example, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While communicating an alert via an unmanned vehicle has been described in connection with the various examples of the various figures, it is to be understood that other similar examples may be used or modifications and additions may be made to the described examples for performing the same function of communicating an alert via an unmanned vehicle without deviating therefrom. For example, one skilled in the art will recognize communicating an alert via an unmanned vehicle as described in the present application may apply to any environment, whether wired or wireless, and may be applied to any number of such devices connected via a communications network and interacting across the network. In another example, an unmanned vehicle, using the alert architecture as discussed herein, can act as an ad hoc communications link that replaces or enhances the functions of a base station (e.g., base station in cellular network 110) or other communication access device 104 to provide bandwidth intensive services (e.g., multimedia), two-way voice service, or the like. Therefore, communicating an alert via an unmanned vehicle should not be limited to any single example, but rather should be construed in breadth and scope in accordance with the appended claims.

What is claimed:
1. An apparatus comprising:
a processor;
a memory coupled to the processor, the memory having stored thereon executable instructions that when executed by the processor cause the processor to effectuate operations comprising:
receiving a message and an indication of a geographical region in which the message is to be communicated by an unmanned aerial vehicle comprising a mobile base station;

providing an instruction to the unmanned aerial vehicle to move towards the geographical region;
  determining that the unmanned aerial vehicle is within range of a portion of the geographical region; and
  responsive to determining that the unmanned aerial vehicle is within the range, instructing the unmanned aerial vehicle to communicate, via the mobile base station, a short message service ("SMS") cellular broadcast text message comprising the message,
  wherein a reception device is an intended recipient of the SMS cellular broadcast text message based on the reception device being located in the portion of the geographical region,
  wherein the geographical region is defined based on an inability of a fixed base station in a vicinity of the geographical region to provide the reception device with non-impaired connectivity to a cellular network.

2. The apparatus of claim 1, wherein the reception device is not mechanically connected with the unmanned aerial vehicle.

3. The apparatus of claim 1, wherein the unmanned aerial vehicle comprises an inflight unmanned vehicle.

4. The apparatus of claim 1, wherein the operations further comprise:
  determining a sub-region of the geographical region based on information associated with a device within the geographical region,
  wherein the instruction instructs the unmanned aerial vehicle to move towards the sub-region.

5. The apparatus of claim 4, wherein the information comprises an indication of a quantity of devices within the sub-region.

6. The apparatus of claim 4, wherein the information comprises an identification of the device as a priority device.

7. The apparatus of claim 1, wherein the apparatus is situated on the unmanned aerial vehicle.

8. An unmanned aerial vehicle comprising:
  a mobile base station having a processor; and
  a memory coupled to the processor, the memory having stored thereon executable instructions that cause the processor to effectuate operations comprising:
    receiving a message and an indication of a geographical region in which the message is to be communicated by the unmanned aerial vehicle;
    receiving an indication of a geographical region associated with the event;
    determining that the unmanned aerial vehicle is within range of a portion of the geographical region; and
    responsive to determining that the unmanned aerial vehicle is within the range, broadcasting, via the mobile base station, a short message service ("SMS") cellular broadcast message comprising the message,
  wherein a reception device is an intended recipient of the SMS cellular broadcast message based on the reception device being located in the portion of the geographical region,
  wherein the geographical region is defined based on an inability of a fixed base station in a vicinity of the geographical region to provide the reception device with non-impaired connectivity to a cellular network.

9. The unmanned aerial vehicle of claim 8, wherein determining that the unmanned aerial vehicle is within the range comprises determining that the unmanned aerial vehicle is in-flight within the range.

10. The unmanned aerial vehicle of claim 8, wherein the operations further comprise:
  responsive to receiving the indication of the geographical region, moving the unmanned aerial vehicle towards the geographical region.

11. The unmanned aerial vehicle of claim 8, wherein the operations further comprise:
  determining a sub-region of the geographical region based on information associated with a device within the geographical region; and
  causing the unmanned aerial vehicle to move towards the sub-region,
  wherein the sub-region comprises the portion of the geographical region.

12. The unmanned aerial vehicle of claim 11, wherein the information comprises an indication of a quantity of devices within the sub-region.

13. The unmanned aerial vehicle of claim 11, wherein the information comprises an identification of the device as a priority device.

14. The unmanned aerial vehicle of claim 8, wherein the message comprises an indication of a severity level pertaining to the indication of the event.

15. The unmanned aerial vehicle of claim 8, wherein the unmanned aerial vehicle comprises an autonomous unmanned aerial vehicle.

16. A non-transitory computer-readable storage medium comprising executable instructions that when executed by a processor of an unmanned aerial vehicle cause the processor to effectuate operations comprising:
  receiving, by the processor, a message and an indication of a geographical region in which the message is to be communicated by a mobile base station of the unmanned aerial vehicle;
  causing the unmanned aerial vehicle to move towards the geographical region;
  determining that the unmanned aerial vehicle is within a range of a portion of the geographical region; and
  responsive to determining that the unmanned aerial vehicle is within the range, causing the mobile base station to broadcast a short message service ("SMS") cellular broadcast message comprising the message,
  wherein a reception device is an intended recipient of the SMS cellular broadcast message based on the reception device being located in the geographical region,
    wherein the geographical region is defined based on an inability of a fixed base station in a vicinity of the geographical region to provide the reception device with non-impaired connectivity to a cellular network.

17. The non-transitory computer-readable storage medium of claim 16, wherein determining that the unmanned aerial vehicle is within the range comprises monitoring a location of the unmanned aerial vehicle.

* * * * *